(12) United States Patent
Mitchell et al.

(10) Patent No.: US 11,799,690 B2
(45) Date of Patent: Oct. 24, 2023

(54) SYSTEMS AND METHODS FOR AUTOMATIC NETWORK VIRTUALIZATION BETWEEN HETEROGENEOUS NETWORKS

(71) Applicant: IP Technology Labs, LLC, Baltimore, MD (US)

(72) Inventors: Gary Mitchell, Owings Mills, MD (US); Scott Whittle, Olney, MD (US); Kurt Quasebarth, Baltimore, MD (US)

(73) Assignee: IP Technology Labs, LLC, Baltimore, MD (US)

( * ) Notice: Subject to any disclaimer, the term of this patent is extended or adjusted under 35 U.S.C. 154(b) by 10 days.

(21) Appl. No.: 17/172,614

(22) Filed: Feb. 10, 2021

(65) Prior Publication Data

US 2022/0255930 A1    Aug. 11, 2022

(51) Int. Cl.
*H04L 12/66*     (2006.01)
*H04L 61/2521*   (2022.01)
*H04L 12/46*     (2006.01)
*H04L 12/70*     (2013.01)

(52) U.S. Cl.
CPC .......... *H04L 12/66* (2013.01); *H04L 12/4633* (2013.01); *H04L 61/2525* (2013.01); *H04L 2012/562* (2013.01); *H04L 2012/5687* (2013.01)

(58) Field of Classification Search
CPC . H04L 12/66; H04L 12/4633; H04L 61/2525; H04L 2012/562; H04L 2012/5687
See application file for complete search history.

(56) References Cited

U.S. PATENT DOCUMENTS

2016/0048397 A1*  2/2016  Morales ................ H04W 12/02
713/2

FOREIGN PATENT DOCUMENTS

CN     1348649 A   *  5/2002   ......... H04B 7/18584
CN   102047611 A   *  5/2011   ......... H04L 12/2818
CN   111935182 A   *  11/2020

* cited by examiner

*Primary Examiner* — Zhensheng Zhang
(74) *Attorney, Agent, or Firm* — Offit Kurman, P.A.; Joseph P. Mathew

(57) ABSTRACT

The invention is that of systems and methods for communications between one or more networks and subsequently network devices configured with a networking application for processing network based communications when the devices are on different logical and physical networks. The methods herein involve translation of remote IP addresses of LAN devices to addresses comprising headend network prefixes, to allow for LAN extension of remote to headend networks and communications between devices on the disparate networks. Data packets from a remote LAN interface are transferred to an outbound interface once translated, then forwarded via a formed bridged tunnel link to a headend network device. A server comprising a local LAN and outbound interface is further configured with a NAT module for IP address translation and an optional security module for additional authenticity verification of remote devices attempting to penetrate the headend network.

6 Claims, 2 Drawing Sheets

SYSTEMS AND METHODS FOR AUTOMATIC NETWORK VIRTUALIZATION BETWEEN HETEROGENEOUS NETWORKS

STATEMENT REGARDING FEDERALLY SPONSORED RESEARCH OR DEVELOPMENT

The invention of the present disclosure was conceived and reduced to practice without federal funding.

BACKGROUND OF THE INVENTION

Current data traffic management solutions often require the configuration of intermediate routers between devices to provide a path for data packet flow between endpoints on different computer networks. The present invention eliminates the existing need in the art to configure intermediate routers in order to provide a path for data packet flow. It also eliminates the action of network address renumbering of remote sites when two or more sites have overlapping network spaces.

Routers, as will be familiar to one of ordinary skill in the art, are devices that are configured to identify networks to which they are connected through one or more interfaces so that they may then forward data packets between those networks. When connecting one or more networks together, a device must be installed to direct incoming data packets to various interfaces on the network known in the art as "hops" in a sequential manner. The information required for a router to properly direct data traffic is typically stored in a route table contained within a router or network host. Based on this information, a router can pass data packets over the correctly determined interface towards the destination of each packet.

A route table can be populated in one of two ways. The first is statically, where the router's route table is pre-programmed with a configuration on which interface(s) represent the next-hop path, and each interface may comprise a virtual route table containing this information. The second is dynamically, where a dynamic routing protocol is configured to receive periodic reachability updates and populate its routing table with that information so the router may direct data traffic flow down the appropriate next-hop path. An "interface" as used herein may refer to any of multiple existing standards as will be familiar to one of ordinary skill in the art, for example, but not limited to Ethernet, fiber optics, virtual network constructions or other suitable communications standards.

A virtual private network (VPN) such as Internet Protocol security (IPsec), as will be familiar to one of ordinary skill in the art, creates a routed tunnel between a remote endpoint interface and a headend interface on a different network. A VPN can be terminated on a router or another appliance, such as a VPN server that is connected to a network. In any case, the router must be configured with the details of what routes are available on the VPN link. Further complications occur when there are multiple routers on a network creating multiple VPN interfaces and potential route paths, in which case route tables are required to be updated for all routers to specify the next-hop path for each data traffic flow.

Unlike traditional IPsec VPNs, which must route between networks, the invention according to the present disclosure permits seamless network access to and from remote network devices, over any wide-area or intermediate underlying network, without configuration of intermediate routers, without multiple routed interfaces, and without requiring any next-hop route entries.

A separate module for security functions can provide conditional access between the networks and devices. For example, in the enterprise, context roles may be set to enable or disable Internet access for each device on the network, while in the home context, a security module may enable Internet access restrictions among members of a household, e.g., with adults enjoying wider access than children. A security module can block or allow traffic from the network and dynamically enable traffic to traverse the tunnel when a network query has been first initiated to the remote local area network (LAN) and maintains a connected state. Also, part of conditional access can be identity verification of devices wishing to communicate and controlling switching behaviors such as allowing, blocking, or redirecting communications after such verification. These and other objects of the invention will be apparent to one of ordinary skill in the art according to the following disclosure.

BRIEF SUMMARY OF THE INVENTION

The invention of the present disclosure enables and controls communications between one or more networks and subsequently network devices configured with a networking application for processing network based communications when the devices are on different logical and typically different physical networks connected via a VPN tunnel. Rather than routing between networks via one or more intermediate layer 3 (i.e., network layer) routers, the system architecture of the present invention combines a bridged virtual tunnel with network address translation (NAT) to extend the headend network all the way to a remote network NAT outbound interface. Thus, any device with an IP address on the headend network will be able to access remote LAN resources without routing, which cannot be accomplished using currently available technologies and methods, wherein NAT is used to establish communications between routed networks, e.g., between a local home network router and the Internet.

In the present disclosure, "forwarding" refers to the action of transferring a data packet from an input link interface to the appropriate output link interface. "Routing" refers to the network-wide process that determines paths that packets take from source to destination.

DETAILED DESCRIPTION OF THE INVENTION

The invention of the present disclosure comprises systems and methods enabling network virtualization between heterogeneous networks (e.g., a headend network and a remote network) without the use of a state of the art VPN or intermediate routers. This is accomplished by creating a "bridged tunnel link" (BTL), defined herein as an extension of a headend network such as but not limited to an Ethernet LAN directly to a remote network, as can be contrasted with providing a private network space such as a VPN through which a device on the headend network may access a remote network end point, with the BTL connecting on one end to a NAT module as opposed to a VPN connecting between headend and remote network routers.

A BTL as described herein is established when an interface located on a remote network, also referred to as a mapped interface, connects with an appliance such as a server located on a headend network. This is accomplished by translation of the network address of the outbound interface to an IP address with a headend IP address prefix, thereby "mapping" the outbound interface to the headend network. This technique achieves the unexpected result of establishing a BTL between the remote and headend networks without creating a separate private space such as a VPN. In this manner, the Ethernet LAN is extended from the headend network to the remote NAT interface.

Figure 1:
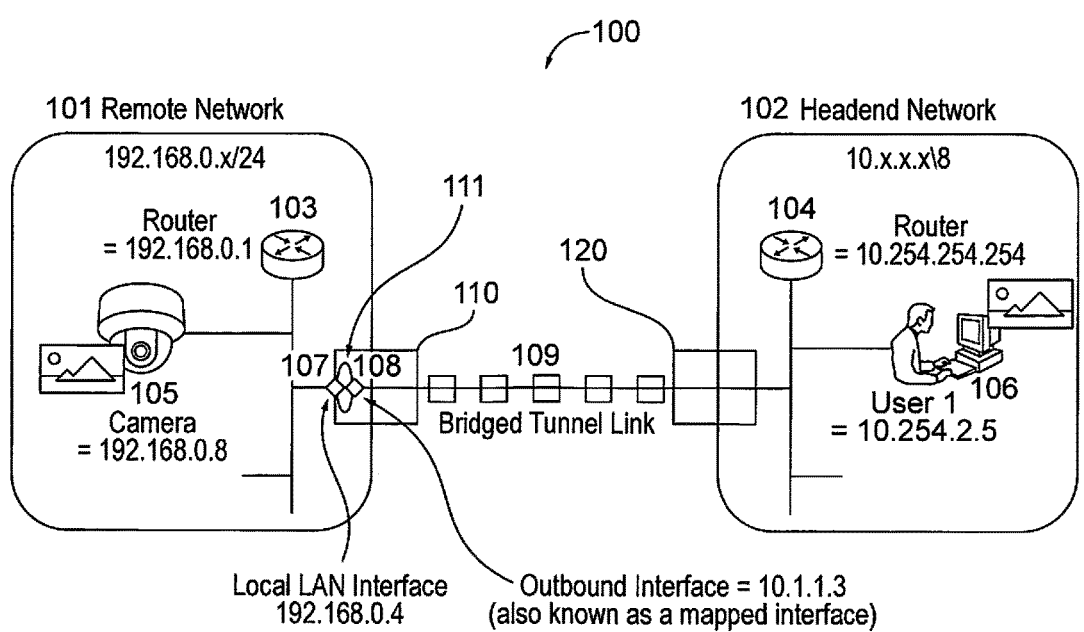
FIG. 1 illustrates a bridged tunnel link between a headend network and remote network operable according to the present disclosure.

The invention of the present disclosure is more fully described with reference to the accompanying drawings. Turning first to FIG. 1, a system according to the present disclosure 100 comprises a remote network 101 and headend network 102, each having distinct host IP address prefixes and supporting various network appliances as will be understood by one of ordinary skill in the art. As shown in FIG. 1, a remote network comprising a local gateway 110 ("gateway" being used herein simply to connote a point of ingress and egress between a network and a communication channel to another, heterogeneous network) equipped with a local LAN interface 107 in communication with a NAT module 111 that translates the LAN interface network address to a predetermined or dynamically determined IP address comprising an IP address network space of the headend network 102. In the illustrative embodiment shown, the LAN interface has the IP address 192.168.0.4, 192 representing a remote network IP address. A connected NAT module 111 comprises instructions which when executed by a microprocessor (not shown) cause the microprocessor to translate the LAN interface IP address to an outbound interface IP address (10.1.1.3) comprising an address within the network space of headend network 102, in this case 10.x.x.x, according to established methods. One of ordinary skill in the art will recognize that the network addresses shown are for the purposes of illustration and merely represent examples of a multitude of compatible IP addresses.

In the example shown in FIG. 1, a camera (illustrative of a network device) 105 situated on remote network 101 may connect with other in-network devices directly on the LAN or via remote router 103, and alternatively, may establish communication with headend network 102 via BTL 109 according to the methods described in the previous paragraph, by transmitting its request to LAN interface 107 for translation and communicating with headend network 102 via the LAN extension provided by the BTL 109. A headend gateway 120 then allows for communication between camera 105 and, for example, a headend network computer 106 that may be used to monitor the camera. Similar to remote network 101, a headend network 102 may be equipped with a local router 104 to allow for local in-network communications among headend network devices, but may also be equipped with a headend gateway 120 to allow for BTL communication with remote network devices, all without configuration or route table updates on local or intermediate routers between these networks.

When an incoming data packet from headend network 102, such as from connected computer 106, is sent toward an address on the remote network outbound interface 108, a NAT is preformed and the data packet is translated and forwarded to the remote LAN interface 107 device using an IP address that is connected to the logical network LAN. As shown in FIG. 1, a device such as but not limited to camera 105 on remote network 101 can communicate with headend network 102 by sending a packet to LAN interface 107, then a connected NAT 111 module maps the data packet flow to the logical network on headend network 102 so that it will directly communicate with devices on the headend network 102 directly via the BTL 109. So, in any case, the headend network 102 is communicating with an IP address on its own network space and the NAT may additionally map incoming communications from headend network 102 to one of a plurality of port numbers associated with devices on remote network 101 (for example a unique port number assigned to camera 105). In this way, headend network 102 is communicating with a device with an address on its own network space. Because each network realm is only communicating with addresses that are local to its own network there is no need for routing between disparate network addresses or ancillary network equipment and applications to have routing configured. Thus, the methods of the present invention reduce the need for such equipment and expenditures associated with configuring, updating, repairing and replacing such equipment.

Figure 2:
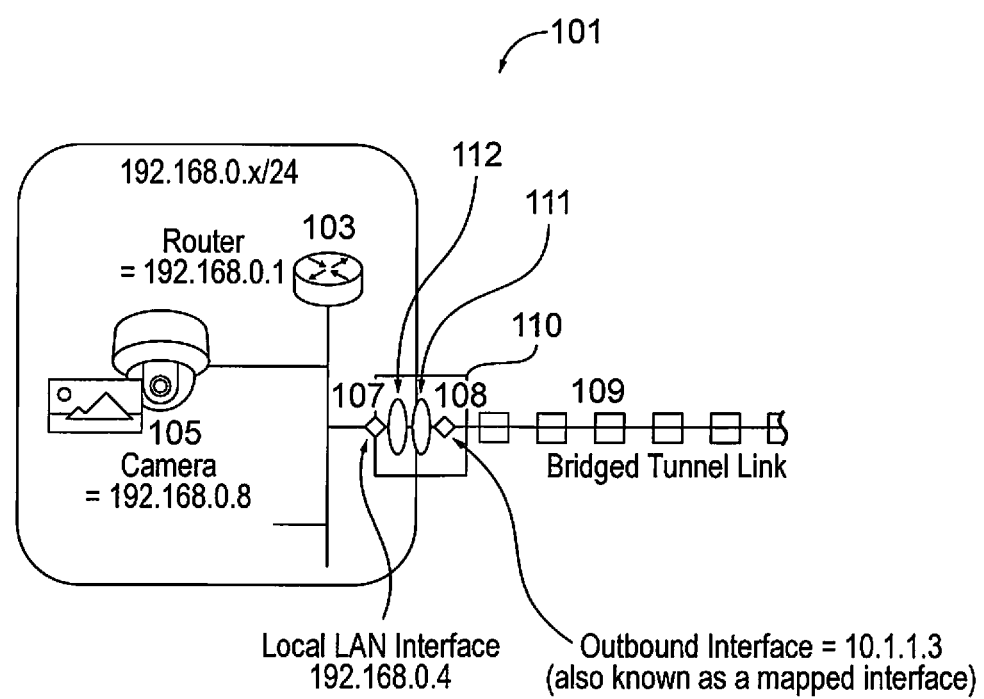
FIG. 2 illustrates a remote network as shown in FIG. 1 with additional security features enabled by a connected security module.

Turning now to FIG. 2, a remote network 101, according to a system 100 as illustrated in FIG. 1 may comprise an optional security module 112 to provide conditional access to data traffic flows to or from remote network 101. An exemplary security module 112 may employ identity-based access-control techniques, such as those based on X.509 certificates, to only permit devices (e.g., camera 105) to traverse the BTL 109 after being verified. Additional to the security module 112, dynamic access control lists (ACLs) can be employed so that only the requested networking ports of the remote network device will allow return traffic. This improves cybersecurity so that a device on the remote network 101 does not have full and unfettered access to the headend network 102 and in fact only can respond to that which has been requested.

To better illustrate the utility of the present invention, consider a large chain store with thousands of locations around the world, each with at least one security camera, with personnel from each store purchasing and installing cameras at the appropriate locations. A central security officer for the full chain may not have knowledge of the IP addresses of the individual cameras present in stores throughout the chain, making communications management from a center difficult. A system of the present disclosure may be deployed with the appropriate communications modules installed thereon, such that personnel at each store may activate the units and thereby enable connectivity to a central network (headend network), thereby enabling a central security officer or staff to have visibility to the footage being collected and stored by all cameras connected to the central network according to the methods described herein. This eliminates the need for countless intermediate routers or the setup of multiple VPNs, or renumbering of network devices and multiple device configurations. These and other advantages of the systems and methods according to the present disclosure will be evident to those of ordinary skill in the art, the examples illustrated in the accompanying drawings and described herein being mere examples of applications of the technical invention claimed by the applicant.

What is claimed:
1. A system for establishing communications between devices on heterogeneous networks, the system comprising:
a remote network comprising a local network device and a local gateway connected thereto, the local gateway comprising a local area network (LAN) interface and an outbound interface, each in network communication with a network address translation (NAT) module, wherein the NAT module comprises instructions tangibly stored on a nontransitory computer readable medium which when, upon transmission of a data packet from the local network device to the local area network interface, cause a connected microprocessor to translate the Internet Protocol (IP) address of the local area network interface to an IP address of the outbound interface, the IP address of the outbound interface including a first prefix is;

a headend network comprising a headend gateway in network communication with a headend module comprising instructions tangibly stored on a nontransitory computer readable medium which when executed by a connected microprocessor cause the microprocessor to establish a communications path between the outbound interface and a headend gateway of the headend network over a bridged tunnel link, thereby establishing a communications path between the local area network device and a headend network device without using a virtual private network (VPN);

wherein the headend network includes a second prefix that is distinct from the first prefix; and wherein no routers are present within the communications path between the local area network device and the headend network device.

2. The system of claim 1, further comprising a security module installed on the local gateway, the security module comprising instructions tangibly stored on a nontransitory computer readable medium which when executed by a connected microprocessor cause the microprocessor to validate one or more security settings of the local network device prior to translation of the IP address of the LAN interface to the IP address of the outbound interface.

3. The system of claim 2, wherein the one or more security settings are selected from the group consisting of permission to access the bridged tunnel link, time during which access to the bridged tunnel link may be granted, geographic location, permission to transfer device content and uniform resource locator of the local device.

4. A method for establishing communications between devices on heterogeneous networks, the method comprising:
    forwarding a data packet from a local network device to an LAN interface;
    translating the IP address of the LAN interface to an IP address of an outbound interface, wherein the IP address of the outbound interface comprises a first IP address prefix;
    forwarding the data packet from the LAN interface to a headend gateway of a headend network via a bridged tunnel link, the headend network having a second IP address prefix that is distinct from the first IP address prefix; and
    establishing a data path between the local network device and a headend network device on the headend network without using a virtual private network (VPN), wherein no routers are present within the communications path between the local area network device and the headend network device.

5. The method of claim 4, further comprising the step of validating one or more security settings of the LAN device prior to translation of the IP address of the LAN interface to the IP address of the outbound interface.

6. The method of claim 5, wherein the one or more security settings are selected from the group consisting of permission to access the bridged tunnel link, time during which access to the bridged tunnel link may be granted, geographic location, permission to transfer device content and uniform resource locator of the local device.

* * * * *